(12) United States Patent
Barlow

(10) Patent No.: US 7,014,762 B2
(45) Date of Patent: Mar. 21, 2006

(54) HIGH CAPACITY PORTABLE EXCHANGE SINGLE BED DEIONIZER

(75) Inventor: Michael M. Barlow, Bartlett, IL (US)

(73) Assignee: Calco, Ltd., Hanover Park, IL (US)

( * ) Notice: Subject to any disclaimer, the term of this patent is extended or adjusted under 35 U.S.C. 154(b) by 260 days.

(21) Appl. No.: 10/713,635

(22) Filed: Nov. 14, 2003

(65) Prior Publication Data

US 2004/0099594 A1     May 27, 2004

Related U.S. Application Data

(63) Continuation-in-part of application No. 09/989,320, filed on Nov. 20, 2001, now Pat. No. 6,776,907.

(51) Int. Cl.
*B01D 15/04*     (2006.01)

(52) U.S. Cl. ...................... 210/263; 210/266; 210/288; 210/291

(58) Field of Classification Search ................ 210/263, 210/266, 291, 288
See application file for complete search history.

(56) References Cited

U.S. PATENT DOCUMENTS

| | | |
|---|---|---|
| 4,670,154 A | 6/1987 | Carlson et al. |
| 5,250,187 A | 10/1993 | Franks |
| 6,534,554 B1 | 3/2003 | Mitchell et al. |

OTHER PUBLICATIONS

Form No. 34053, Water Refining Industrial, "Fiberglass Exchange Tanks—10" & 14"," approximately 1987.
Form No. 30452, Water Refining Industrial, "Wareco Exchange Tanks—10" & 12"," approximately 1987.
Water Services Corporation, Waukesha, Wisconsin, brochure, Water Services, Exchange Deionizers, MBX Series Deionizers, "Deionized Water Service for Ultrapure Water," approximately 1992.
EX-Ix, "The Ultimate Ion Exchange System," published approximately 1995.
Calco Ltd., Hanover Park, Illinois, brochure, D.I. Service Systems, "A Size And Design for Every Application," approximately 1997.

*Primary Examiner*—Chester T. Barry
(74) *Attorney, Agent, or Firm*—Wallenstein Wagner & Rockey, Ltd.

(57) ABSTRACT

A device for the deionization of incoming water is disclosed. The device includes a tank and a generally hollow distributor tube in the tank for ingress into and downward movement of unpurified water through the tank. An opening adjacent the bottom of the generally hollow distributor tube and near the bottom of the tank distributes the unpurified water out of the generally hollow distributor tube. A mixed bed of purifying resin is within the tank, and surrounds the generally hollow distributor tube. The unpurified water travels upwardly through the tank where it is deionized to a high purity water by the mixed bed of purifying resin, after egress from the opening. The deionized water passes through a distributor and a filter before leaving the tank through an outlet.

16 Claims, 4 Drawing Sheets

HIGH CAPACITY PORTABLE EXCHANGE SINGLE BED DEIONIZER

RELATED APPLICATION

This application is a continuation-in-part of U.S. patent application Ser. No. 09/989,320 for "High Capacity Portable Exchange Single Bed Deionizer" filed on Nov. 20, 2001 now U.S. Pat. No. 6,776,907, which is incorporated by reference herein.

TECHNICAL FIELD

This invention relates to a device and method for the deionization of incoming water. Particularly, the invention is a device and method for achieving a high operating capacity through the use of the reversal of water flow in a monobed or mixed bed ion exchange deionizer, resulting in improved flow kinetics.

BACKGROUND OF THE INVENTION

It is well-known in the art that deionized water can be created by moving tap water through an ion exchange resin bed. In one method, resins fill much of a cylindrical tank. The resins can be of a mixed bed type. For the purposes of this invention, a "mixed bed resin" is a blend of a cationic and an anionic resin, in an equivalent ratio of 1:1.

In such systems and methods, water enters the top of the cylindrical tank, and moves downwardly through the resin within the tank. When the water has moved through the resin and reached the bottom of the tank, it has been deionized.

At this point, the deionized water flows into slots at the bottom of a hollow tube. The inside of the hollow tube contains no resin, but is typically surrounded by the resin within the tank. After entering the slots at the bottom of the tube, the deionized water moves upwardly through the hollow tube, and out of the tank.

High purity water can also be prepared by deionization through reverse osmosis. In high purity water systems, the ion exchange resin bed and reverse osmosis deionization technologies may be used either separately or together.

Many moderate to medium volume users of high purity water systems use ion exchange resin systems. Typically, two kinds of ion exchange resins are used for water deionization. The first kind of resin is a cationic resin, which removes cations from the water. The second kind of resin is an anionic resin, which removes anions from the water. These resins are eventually exhausted, lose their ability to deionize water, and thus need to be regenerated. These moderate to medium users of high purity water systems depend upon local service companies. In connection with such services, a tank with exhausted resin is replaced by a tank with fresh or regenerated resin. The service then regenerates the exhausted resin, using an acid such as hydrochloric acid or sulfuric acid for cationic resins, and caustic, such as sodium hydroxide, for the anionic resins. The regeneration process in such portable exchange systems takes place off site in a regeneration facility of the service provider.

There are many different versions of such prior art systems. As noted above, reverse osmosis systems may be used independently, and are viable alternatives for the preparation of high purity water. However, reverse osmosis systems are often higher in cost, require additional pretreatment and storage equipment, and typically rely upon a final, resin bed "polisher" tank to provide high purity water.

Resin-based systems are also common, and are typically used where higher capacities are required. A first such resin-based system has two tanks connected in series. The first tank contains a cationic resin, and the second tank contains an anionic resin. Under such an arrangement, both such tanks are typically exhausted simultaneously. The quality of water is determined by its specific resistance; the higher the specific resistance, the higher the quality of the water. Commonly, the two tanks are removed when the specific resistance of the deionized water has fallen to about 20,000 ohms-cm.

Another resin-based system has two tanks connected in series, and both of these tanks contain a mixture of an anionic and cationic resin, otherwise known as a "mixed-bed" resin. This type of system, using identical tanks, provides for a main deionization tank, followed by a so-called "polisher" tank. This type of system also provides for a back-up tank, in essence a second deionization tank, between the main tank and the polisher tank, to enable deionization to continue even in the event that the first tank fails or is exhausted. These types of systems are typically used where higher water purity qualities are required. The first tank is removed and replaced with a tank containing regenerated resin, when the specific resistance of the deionized water has fallen to about 200,000 ohms-cm.

A third type of resin-based system is a hybrid of the above two described resin systems. Particularly, this third system includes one tank having a cationic resin, a second tank having an anionic resin, and a third tank having a mixed bed resin. The first two tanks are the so-called "worker" tanks, while the third tank is the "polisher" tank, to achieve high levels of water purity.

The flow pattern in each of these prior art systems is like the prior art system shown in FIG. 2, i.e., the "down-flow" type, where the unpurified water enters the tank and moves downwardly through the resin for deionization.

SUMMARY OF THE INVENTION

The invention is a device and method for deionizing water. The first aspect of the invention comprises a device for the deionization of unpurified water. The device comprises a tank for containing a mixed bed of purifying resin. The device also includes a generally hollow distributor tube in the tank for ingress into and downward movement of the unpurified water through the tank.

An opening is positioned adjacent the bottom of the generally hollow distributor tube, and near the bottom of the tank, for distributing the unpurified water out of the generally hollow distributor tube. After egress from the opening, the water moves upwardly through a mixed bed of purifying resin within the tank. This resin in the tank surrounds the generally hollow distributor tube, but no resin is contained within the generally hollow distributor tube. The water moves through the mixed bed of purifying resin in an upward direction. After it has moved upwardly through the mixed bed of purifying resin, the water is deionized.

In another aspect of the invention, the generally hollow distributor tube is positioned substantially in the axial center of the tank. In still another aspect of the invention, the opening adjacent the bottom of the generally hollow distributor tube is a rectangular slot.

Yet another aspect of the invention comprises a device for the deionization of unpurified water having a tank with an outlet. The deionized water passes through a distributor and a filter before leaving the tank through the outlet.

In still another aspect of the invention, the filter is made of reticulated foam. In yet another aspect of the invention, the filter has a substantially cylindrical outer wall spaced radially outward from a substantially cylindrical inner wall. In still another aspect of the invention, the filter is annularly disposed about the distributor.

In the method of the invention, incoming water is deionized by treatment within a tank. The method comprises placing unpurified water into the top of a generally hollow distributor tube that is positioned within the tank. This unpurified water moves downwardly through this tube.

When the incoming water reaches the bottom of the generally hollow distributor tube, it exits the tube through openings adjacent the bottom of the tube. After exiting the openings, the water is moved upwardly through a bed of ion exchange resin within the tank. In this way, the water is deionized by the resin.

In another aspect of the method, the generally hollow distributor tube is positioned substantially in the axial center of the tank. In yet another aspect of the method, the openings adjacent the bottom of the generally hollow distributor tube are rectangular slots. In still another aspect of the invention, the purifying resin is a mixed bed resin.

It has been found, surprisingly, that the reversal of the flow of water through the resin-containing tank both extends the operating capacity of the resin, and produces a better quality of highly purified water.

Particularly, comparing the device and process of the invention to typical down flow mixed bed ion exchange deionizers, 50%–60% higher operating deionization capacity is achieved through a monobed (or mixed bed) ion exchange resin bed of the present invention's single tank configuration. The process incorporates improved kinetics through the mixed bed ion exchange resin bed utilizing a bi-lateral flow pattern upwardly through the resin bed. The water produced is of a higher quality than water produced in most typical two bed systems. Two bed systems produce water having, on an average, 200,000–1,000,000 Ohm-cm of specific resistance. In contrast, the present invention provides water in the range of 8,000,000 Ohms at the start to 200,000 Ohms, the reverse of a typical two separate bed system. The cationic and anionic resin components are in a consistent 1:1 equivalent (40%–60% by volume) mixture. Thus, the resins are exhausted uniformly in a 1:1 ratio, providing almost neutral pH in a perfectly deionized water.

Furthermore, this process provides significant economic advantages to deionized water service companies/dealers and to the end user, because only a single tank is being used to incorporate a two bed system. Regeneration is accomplished in a single regenerator vessel. Thus, the process minimizes the amount of inventory for service tanks and resins, minimizes the cost of original regeneration capital equipment, and improves operating economics.

In a typical system design for this invention, two tanks are connected in series. The first tank is the upward flow high capacity deionizer, followed by a typical downward flow mixed bed polisher tank. Upon exhaustion of the first "high capacity" tank, the secondary tank is moved up and converted to an upward flow configuration, and a new polishing tank is installed. This moved up tank is found to yield an additional 50%–60% capacity in this system configuration. As only a one tank exchange is needed, users are provided with additional economic benefits.

In contrast, in a typical two tank, separate beds system, two tanks are replaced during each exchange. These systems require an additional third polishing tank as a back up, adding to the expense of such systems.

DETAILED DESCRIPTION OF A PREFERRED EMBODIMENT OF THE INVENTION

This invention is susceptible of embodiments in many different forms. The specification and drawings describe and depict in detail a preferred embodiment of the invention. This disclosure is to be considered as one example of the invention. This disclosure is not intended to limit the broad aspect of the invention to the embodiments illustrated.

Figure 1:
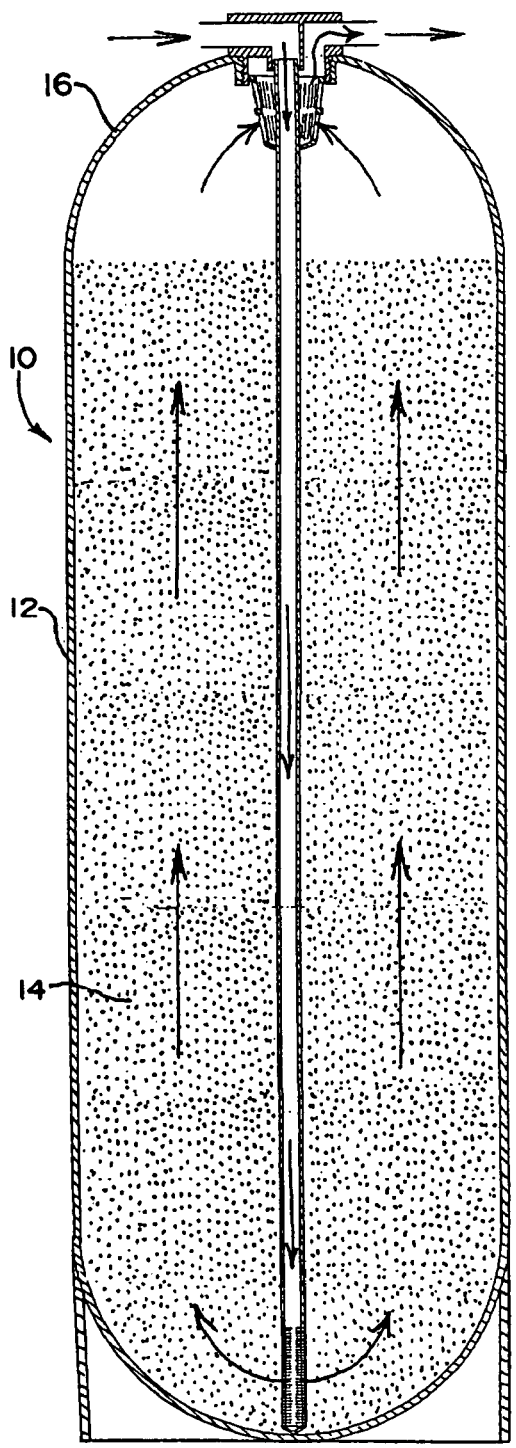
FIG. 1 is a sectional view of a device in accordance with the invention.
Figure 2:
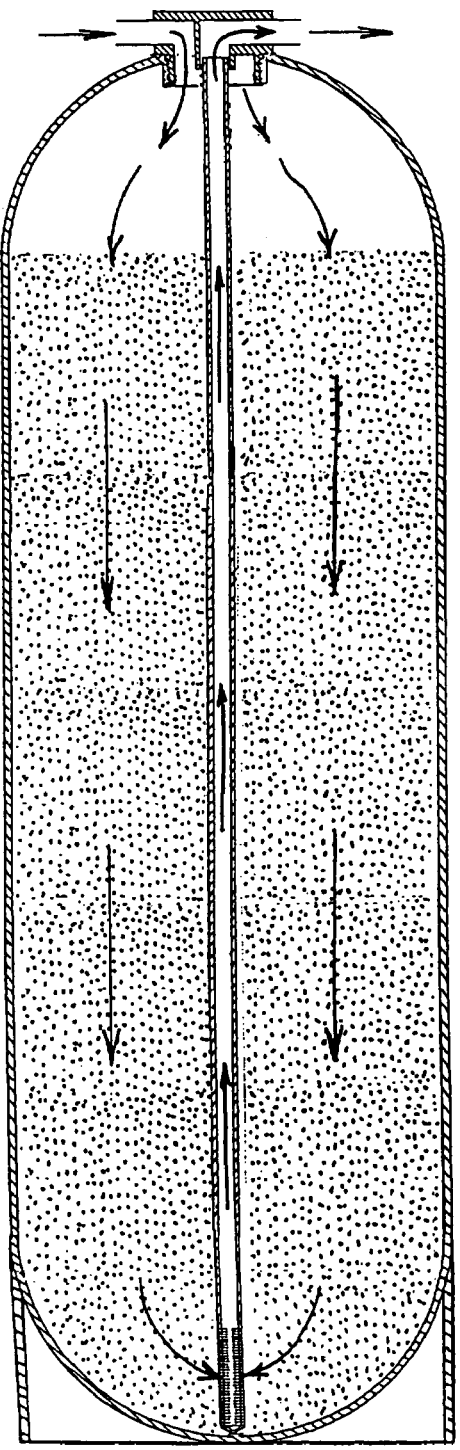
FIG. 2 is a sectional view of a prior art device.

Referring to the drawings, FIG. 1 shows a sectional view of a device 10 in accordance with the invention. The device 10 of FIG. 1 differs from the prior art device of FIG. 2 in one important respect. Particularly, the prior art device of FIG. 2 is used to deionize water that moves initially into the top of the tank, then down through the resin, then into the slots at the bottom of the hollow tube, and then upwardly through the tube and out of the tank.

In contrast, in the present invention, i.e., in the otherwise identical device of FIG. 1, the water is deionized by moving initially into and downwardly through the hollow tube, out of the slots at the bottom of the hollow tube, and then upwardly through a mixed bed resin and out of the tank. While such so-called counterflow systems may exist for water softening systems, they do not exist in high-purity water systems utilizing mixed bed resins. High purity water is critical for certain users, such as laboratories, manufacturers of printed circuit boards, plating companies, and other industries. For purposes of this invention, high purity water is defined as water that is deionized.

The invention is a device 10 and a method for deionizing water. The first aspect of the invention comprises a device 10 for the deionization of incoming water. The device 10 comprises a generally cylindrical tank 12 for containing a mixed bed of purifying resin 14. The tank 12 has preferred dimensions of approximately thirteen (13) inches in diameter, and approximately fifty-four (54) inches in height, however, other suitable tank sizes can be utilized. Several commercially available mixed bed resins are suitable for the present invention, but a preferred mixed bed resin 14 for the present invention is made by the Rohm & Haas Company under its Catalog No. UP-4150. As may best be seen in FIG. 1, this high capacity mixed bed resin 14 does not fill the entire cylindrical tank 12, but instead fills the tank 12 to a point roughly at the bottom of a hemispherical head portion 16 that defines the top of the tank 12. The mixed bed resin 14 is typically a cationic/anionic mixture, and has volume percentages of about 40% cationic and 60% anionic. However, any suitable water-purifying ion exchange resin or mixture of resins may be used instead of the preferred 40% cationic and 60% anionic mixed bed resin 14.

The device 10 also includes a generally hollow distributor tube 18. This generally hollow distributor tube 18 is preferably made of a rigid polymer, and is preferably positioned approximately in the axial center of the tank 12. The generally hollow distributor tube 18 provides for ingress of the incoming water into, and downward movement through, the tank 12. In the attached FIGS. 1 and 2, the paths of the water moving through the device, and the direction of flow of that water, are both indicated by arrows.

Figure 5:
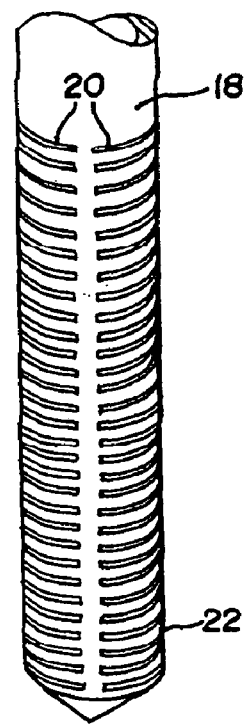
FIG. 5 is an enlarged view of the lower portion of the generally hollow distributor tube shown in FIG. 1, and the slots at the bottom of this tube.

As shown in FIGS. 1 and 5, openings 20 are formed in the generally hollow distributor tube 18. As may best be seen in FIG. 1, the openings 20 are positioned near the bottom of the tank 12. Specifically, the openings 20 should extend upwardly about three to three and one-half (3–3½) inches from the bottom of the generally hollow distributor tube 18. In this preferred embodiment, the openings 20 are rectangular slots. The openings 20 take the downwardly moving water and discharge that water into the bottom of the tank 12, forcing the water to move upwards into the mixed bed of resin 14. This water movement is best depicted by the two curved, bottommost arrows shown in FIG. 1.

The water is continuously discharged through these openings 20 as pressurized water enters the tank 12 and its generally hollow distributor tube 18. As the water is discharged through these openings 20, it forces the remaining water in the mixed bed of resin 14 in an upward direction through the mixed bed of resin, where it becomes deionized.

It will be understood that while the mixed bed of resin 14 in the tank 12 surrounds the generally hollow distributor tube 18, no resin 14 is contained within the generally hollow distributor tube 18.

Figure 3:
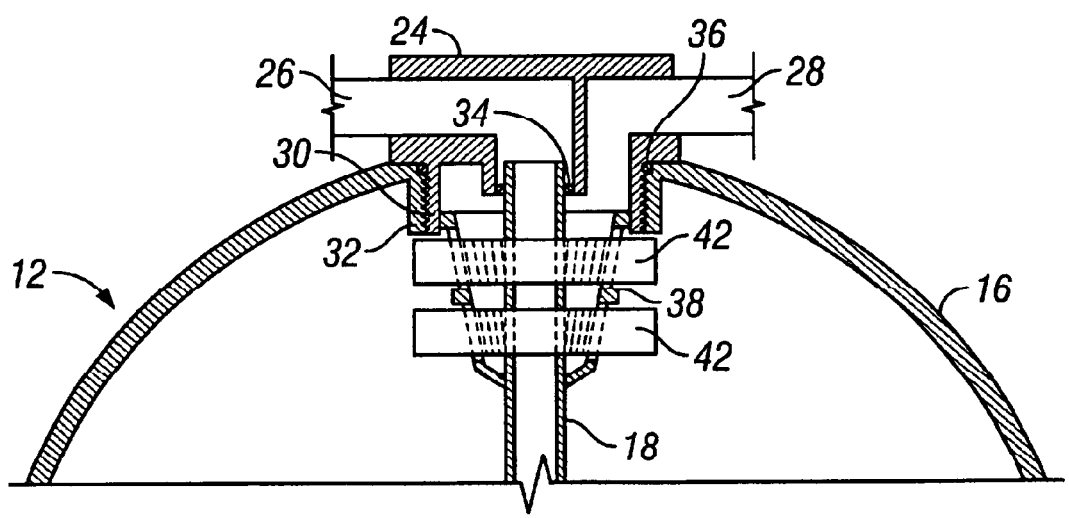
FIG. 3 is an enlarged view of an upper part of the hemispherical head portion at the top of the tank of the device of FIG. 1.
Figure 4:
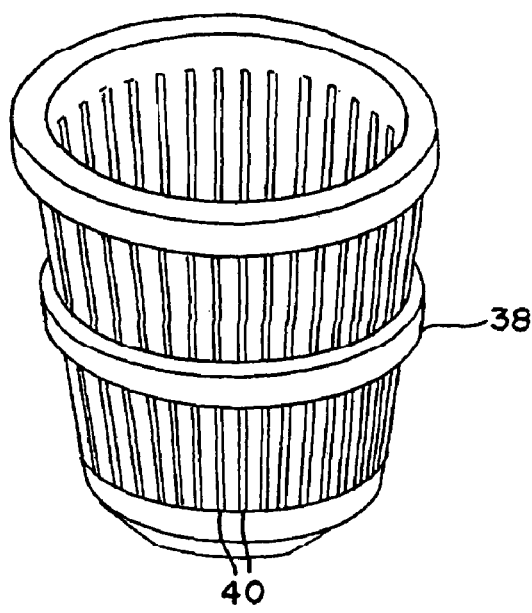
FIG. 4 is a perspective view of an upper distributor basket.

Details of the various other elements of the device 10 are shown in FIGS. 3 and 4. FIG. 3 depicts an enlarged view of an upper part of the hemispherical head portion 16 at the top of the tank 12. The water enters the tank 12 through a polymeric tank closure or manifold 24. The tank closure 24 includes an inlet 26 and an outlet 28. Both the inlet 26 and the outlet 28 are preferably ¾" HPT quick connects.

The base of the tank closure 24 has a threaded portion 30 that secures the closure 24 to complementary threads 32 near the top of the hemispherical head 16 of the tank 12. Typically, these are #8 threads, and they extend for about 2½" along the exterior of the tank closure 24.

As may also be seen in FIG. 3, an O-ring 36 is seated between the tank closure 24 and the top of the tank 12, and this O-ring 36 provides a water-tight seal for the tank 12.

The top of the generally hollow distributor tube 18 is secured to the tank closure 24. This securement takes place by pushing the top of the generally hollow distributor tube 18 into a central hole of the tank closure 24. The inlet 26 of the tank closure 24 provides, with the hollow distributor tube 18, a continuous path for the incoming water to the tank 12. As may also be seen in FIG. 3, a second O-ring 34 provides yet another water tight seal, this seal being positioned between the outside of the generally hollow distributor tube 18 and a portion of the tank closure 24.

As may be seen in FIG. 3, an upper distributor basket 38 is secured to the lowest extremity of the tank closure 24. Details of the upper distributor basket 38 are shown in FIG. 4. Typically, the securement of the basket 38 to the polymeric tank closure 24 is facilitated by the use of any one of several suitable adhesives.

The upper distributor basket 38 is preferably made of a hard polymeric material. Like the generally hollow distributor tube 18, the upper distributor basket 38 includes thin rectangular slots 40 through which water can flow. Like the openings 20 in the generally hollow distributor tube 18, these thin rectangular slots 40 are small enough to prevent any of the mixed bed resin 14 from passing through them.

Filters 42 annularly disposed about the distributor basket 38 prevent the thin rectangular slots 40 in the upper distributor basket 38 from becoming clogged with the mixed bed resin 14. As the deionized water passes through the distributor basket 38 and the filters 42 before leaving the tank through the outlet 28, the mixed bed resin 14 cannot leave the tank 12 with the exiting water, and remains in its proper place within the tank 12. In this preferred embodiment, the filters 42 are made of polyester reticulated foam with a substantially cylindrical outer wall spaced radially outward from a substantially cylindrical inner wall, resembling a foam doughnut. The specific measurements of this preferred round filter are: 2.75" outer diameter, 1" inner diameter center hole, and 1" thickness. Such filters are sold under part number 3960 by UFP Technologies located in Addison, Ill. However, other suitable materials and configurations may be used to filter the mixed bed resin 14 from the water exiting the tank 12.

As the water moves upwardly through the mixed bed resin 14 and into the empty, hemispherical head portion 16 of the tank 12, it has been deionized and is ready to leave the tank 12. The deionized water at the top of the tank 12 leaves the tank 12 through the continuous path formed by the filters 42, the upper distributor basket 38, and the outlet 28 of the tank closure 24.

Figure 6:
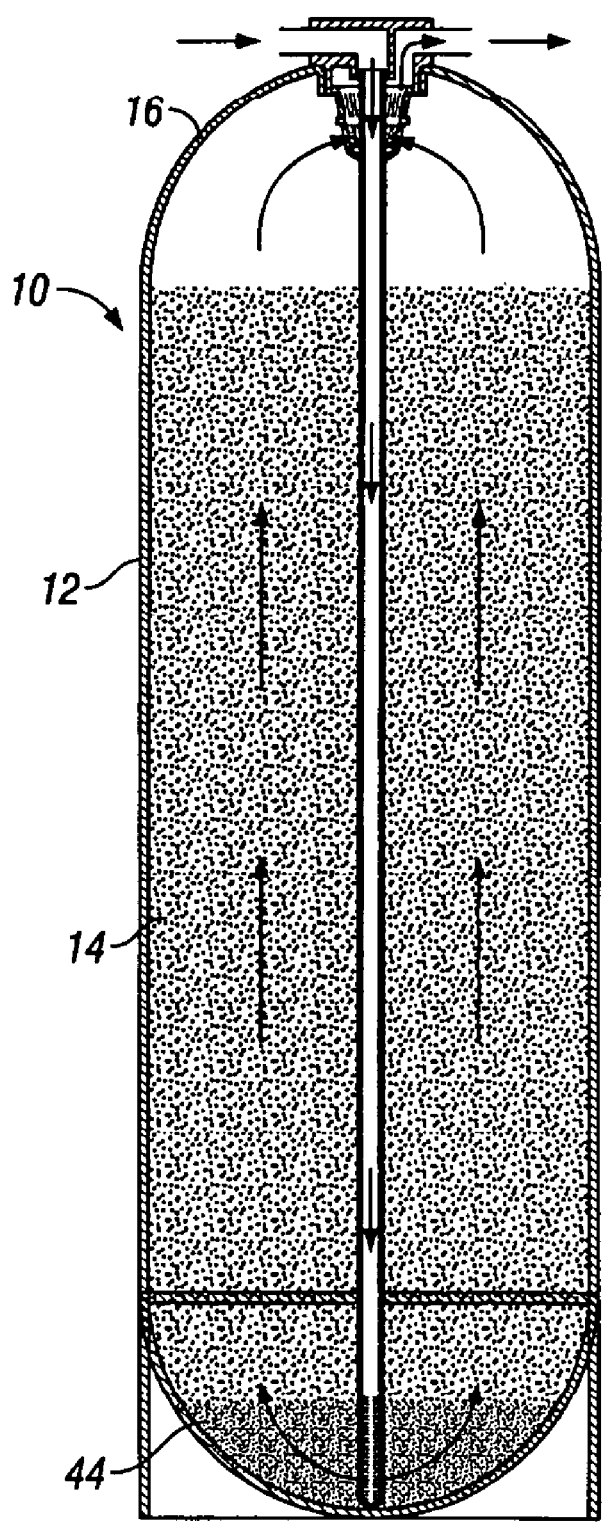
FIG. 6 is a sectional view of a device in accordance with the invention after a period of use.

Before it is used, the mixed bed of purifying resin 14 is a homogeneous mixture of cationic resin and anionic resin. However, as shown in FIG. 6, after the mixed bed of purifying resin 14 has been used for a period of time, a portion of the cationic resin 44 accumulates in the bottom three or four inches of the tank 12. This is because the cationic resin 44 is heavier than the anionic resin by about 10 pounds per cubic foot.

It should be understood by those skilled in the art that the tank 12 and other elements of the device 10 of FIG. 1 may be placed in-line with other tanks, for example another identical tank, and then a mixed bed polisher.

In the method of the invention, incoming water is deionized by treatment within the tank 12. The method comprises placing incoming water into the top of a generally hollow distributor tube 18 that is positioned within the tank. This unpurified water moves downwardly through this tube 18.

When the incoming water reaches the bottom 22 of the generally hollow distributor tube 18, it exits the tube 18 through openings 20 adjacent the bottom 22 of the tube 18. After exiting the openings 20, the incoming water is moved upwardly through a bed of ion exchange resin 14 within the tank 12. In this way, the incoming water is deionized by the resin 14.

In another aspect of the method, the generally hollow distributor tube 18 is positioned substantially in the axial center of the tank 12. In yet another aspect of the method, the openings 20 adjacent the bottom 22 of the generally hollow tube 18 are rectangular slots. In still another aspect of the invention, the purifying resin 14 is a mixed bed resin.

As compared to the prior art resin systems of FIG. 2, i.e., the so-called "down-flow" systems, it has been surprisingly found that the mere reversal of the water flow in the direction shown in FIG. 1 provides substantial operating advantages. First, when comparing systems using two high capacity mixed bed resin tanks and one mixed bed polishing tank, all of the tanks being in series, the invention using the water flow path of FIG. 1 provides from 55 to 65% additional water purification capacity, before exhaustion of the resin, than otherwise identical "down-flow" systems. While the reasons for this are unclear, it is speculated that the invention of FIG. 1 somehow results in improved utilization of the ion exchange sites of the resin. This allows continuous classification of the resin beads on the bed and more uniform distribution or stratification of the bed.

This system also reduces the number of service calls necessary from regeneration services, and lowers the cost per gallon of the purification process. Regeneration plant costs can be cut by as much as 60% by eliminating up to two additional regenerator and chemical neutralization units.

Additional advantages include higher quality or higher purity water. Particularly, in tests performed after use of the present invention, it was found that the water can be maintained at a specific resistance of over 10 megohms-cm.

In contrast, dual bed resin down-flow water purification systems (one tank containing cationic resins and another containing anionic resins) initially have a specific resistance of only about 1–2 megohm-cm. In addition, this specific resistance is not maintained for any appreciable length of time, but instead the water quality declines to a specific resistance of about 500- and then down to 200 kilo-ohms for the majority of the service run.

There is another advantage over a prior art dual bed resin. Specifically, the present mixed bed resin system lowers the amount of resin that must be retained in inventory, and also allows regeneration of the resin in a single regeneration tank. As a result, the regeneration process is always the same, and better quality control invariably results. Service providers can also minimize their expenditures for regeneration equipment, resin and tank inventories, and raw materials, thus providing customers with a more economical solution.

The present systems are modular and portable, allowing flexibility in designs and configurations. This flexibility permits custom design of systems for virtually any moderate to medium volume water purification plant. One tank, as shown in FIG. 1, would be adequate to purify water. More typically, however, as noted above, two main tanks are used in series, with an additional polishing tank. Additional tanks can be added to the two main tanks normally used in series, such that there are three or four main tanks in series, in order to accommodate higher volume users.

It will be understood that, given the above description of the embodiments of the invention, various modifications may be made by one skilled in the art. Such modifications are intended to be encompassed by the claims below.

What is claimed is:

1. A device for the deionization of incoming water comprising: (a) a tank; (b) a generally hollow distributor tube in the tank for ingress into and downward movement of unpurified water through the tank; (c) an opening adjacent the bottom of the generally hollow distributor tube and near the bottom of the tank for distributing the unpurified water out of the generally hollow distributor tube; and (d) a mixed bed of purifying resin within the tank, and surrounding the generally hollow distributor tube, through which the unpurified water travels upwardly, and is deionized to a high purity water by the mixed bed of purifying resin, as it moves upwardly through the mixed bed of purifying resin, after egress from the opening.

2. The device of claim 1, wherein the generally hollow distributor tube is positioned substantially in the axial center of the tank.

3. The device of claim 1, wherein the opening adjacent the bottom of the generally hollow distributor tube is a rectangular slot.

4. The device of claim 1 further comprising: (a) an outlet for egress of deionized water from the tank; (b) a distributor; and (c) a filter, wherein the deionized water passes through the distributor and the filter before leaving the tank through the outlet.

5. The device of claim 4, wherein the filter is made of reticulated foam.

6. The device of claim 4, wherein the filter has a substantially cylindrical outer wall spaced radially outward from a substantially cylindrical inner wall.

7. The device of claim 4, wherein the filter is annularly disposed about the distributor.

8. A device for the deionization of incoming water comprising: (a) a tank; (b) an outlet for egress of deionized water; (c) a distributor; and (d) a filter, wherein the deionized water passes through the distributor and the filter before leaving the tank through the outlet.

9. The device of claim 8, wherein the filter is made of reticulated foam.

10. The device of claim 8, wherein the filter has a substantially cylindrical outer wall spaced radially outward from a substantially cylindrical inner wall.

11. The device of claim 8, wherein the filter is annularly disposed about the distributor.

12. The device of claim 8 further comprising a mixed bed of purifying resin within the tank.

13. The device of claim 12, wherein the unpurified water is deionized to a high purity water by traveling upwardly through the mixed bed of purifying resin.

14. The device of claim 8 further comprising a generally hollow distributor tube in the tank for ingress into and downward movement of unpurified water through the tank, wherein the generally hollow distributor tube is positioned substantially in the axial center of the tank.

15. The device of claim 14 further comprising an opening adjacent the bottom of the generally hollow distributor tube and near the bottom of the tank for distributing the unpurified water out of the generally hollow distributor tube.

16. The device of claim 15, wherein the opening adjacent the bottom of the generally hollow distributor tube is a rectangular slot.

* * * * *